Figure 6:
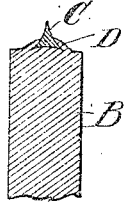

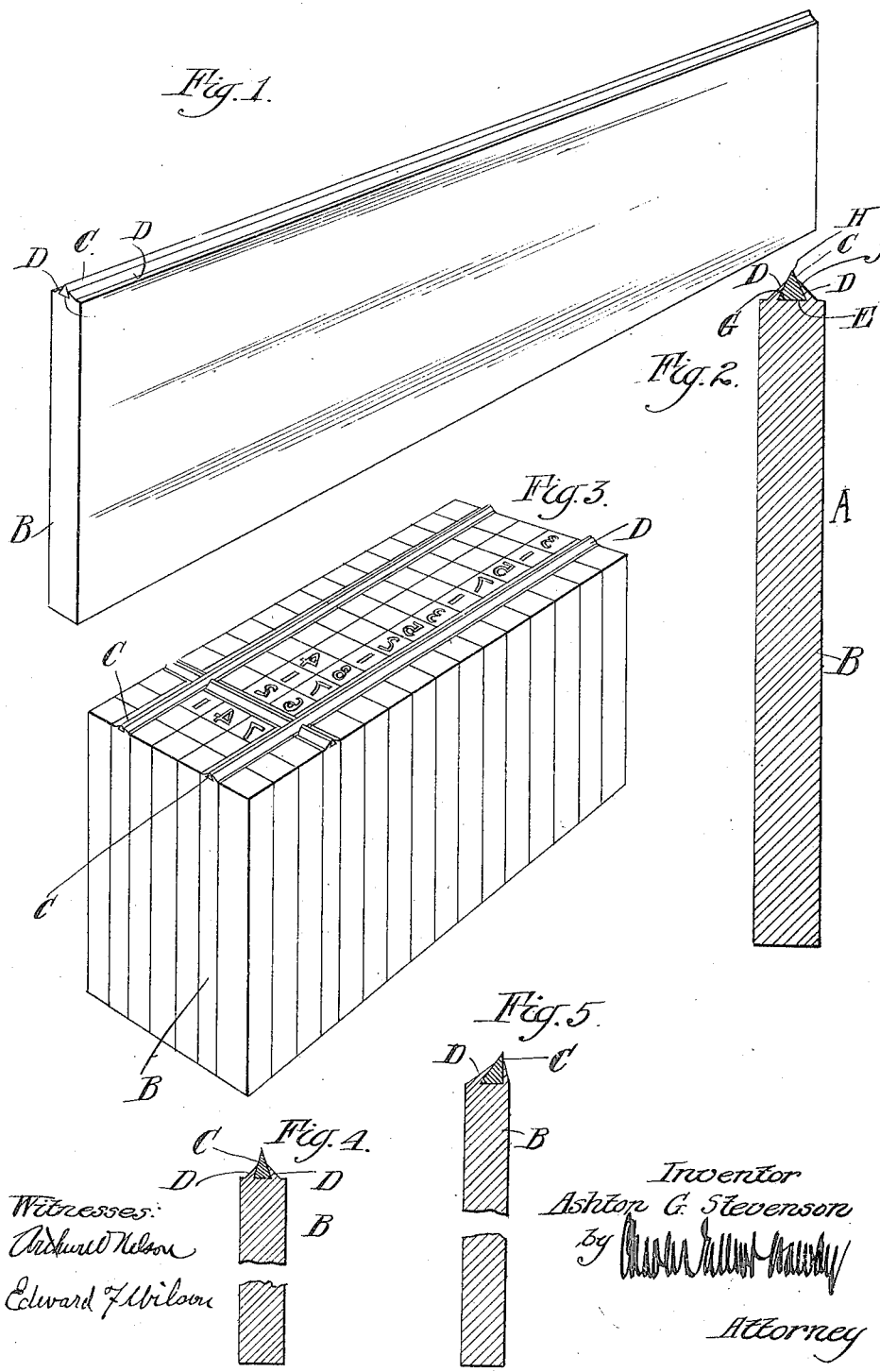

A. G. STEVENSON.
SUBSTITUTE FOR PRINTERS' BRASS RULES.
APPLICATION FILED SEPT. 9, 1910.
1,135,145.
Patented Apr. 13, 1915.
3 SHEETS—SHEET 2.

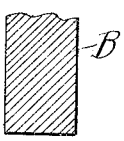

Witnesses:
Edward F. Wilson
Inventor:
Ashton G. Stevenson
by
Attorney

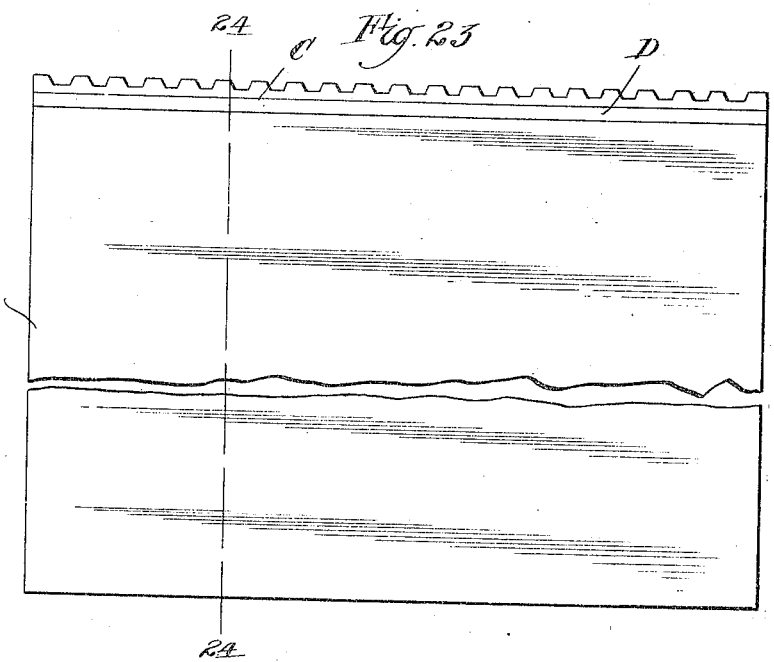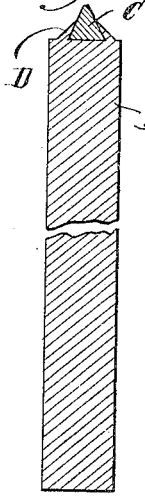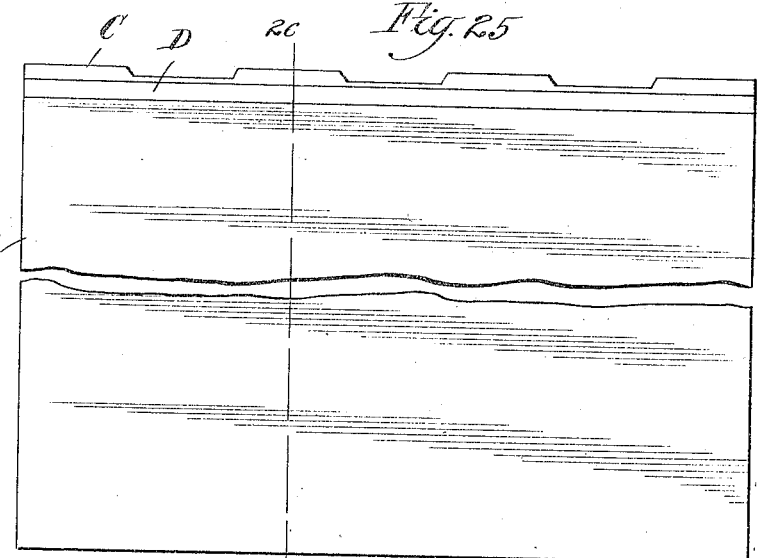

UNITED STATES PATENT OFFICE.

ASHTON G. STEVENSON, OF CHICAGO, ILLINOIS, ASSIGNOR TO CHICAGO LINO-TABLER COMPANY, OF CHICAGO, ILLINOIS, A CORPORATION OF ILLINOIS.

SUBSTITUTE FOR PRINTERS' BRASS RULES.

1,135,145.  Specification of Letters Patent.  Patented Apr. 13, 1915.

Application filed September 9, 1910. Serial No. 581,325.

*To all whom it may concern:*

Be it known that I, ASHTON G. STEVENSON, a citizen of the United States, and a resident of Chicago, Cook county, Illinois, have invented certain new and useful Improvements in Substitutes for Printers' Brass Rules, of which the following is a full, true, clear, and exact description.

My invention relates to improvements in printing devices and has particular reference to printers' rules for printing or impressing lines upon printable surfaces.

The object of the invention is to provide a cheap and satisfactory substitute for the printers' brass rules usually employed by printers for printing lines.

A further object of the invention is to provide a rule for printers' use which, while its cost is comparatively slight, is yet capable of being formed for printing any desired style or kind of line or border.

The rules usually employed in composing printing forms are type high bars or strips of brass having one edge formed for printing or impressing a line, and as this material is comparatively expensive and the bar of necessity has to be accurately formed, it is seen that the capital which is tied up in this adjunct to a printing office may, and frequently does, run into quite large amounts. It is with the object of reducing the necessity of this large investment and of producing a rule which will be as convenient and satisfactory to use as the brass rule now employed, that I have produced the rule which is the subject of this application.

My invention consists in a composite rule having its main body portion formed of a comparatively inexpensive material and its upper or printing edge or portion formed of a comparatively hard wire, strip or rod suitably secured to the body portion.

The invention further consists in a rule having its major body portion formed of comparatively inexpensive, bendable metal and provided on its upper surface with integral engaging flanges or lugs, and a comparatively hard metal printing member secured upon the upper surface of the body portion by means of said flanges or lugs, the combined height of the body portion and the printing member being substantially type height.

Looked at from another point of view my invention is embodied in a ruling member of comparatively very slight cross sectional area, supported upon and reinforced by a body member of comparatively large cross sectional area, the combined height of the two members being substantially type height.

Figure 27:
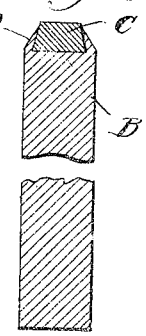
Figure 22:
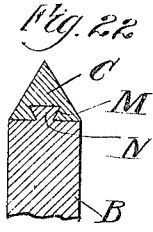

My invention will be more readily understood by reference to the accompanying drawings forming part of this specification and in which;

Figure 1 is an enlarged perspective view of a rule for printers' use, embodying my invention; Fig. 2 is a cross section of the rule shown in Fig. 1 but on a still larger scale; Fig. 3 is an enlarged perspective view of a composed body of type illustrating the use or application of my novel rule; Figs. 4 and 5 are cross sections of rules showing slight modifications of the hard metal printing member; Fig. 6 is a section similar to Fig. 2, but showing a modified form of the hard metal ruling member; Figs. 7 to 18 inclusive are similar sections of rules illustrating still further modifications of the hard metal ruling member; Figs. 19 to 22 inclusive are sections similar to Fig. 2 but illustrating the mounting of various forms of the hard metal ruling member upon the soft metal body portion; Fig. 23 is an enlarged side elevation of a rule or leader designed to print dots; Fig. 24 is a vertical cross section of the rule on the line 24—24 of Fig. 23; Fig. 25 is an enlarged side elevation of a rule or leader formed to print dashes; Fig. 26 is a vertical section of same on the line 26—26 of Fig. 25; and Fig. 27 illustrates a very broad ruling member and its mounting.

In said drawings A represents the rule as a whole which is built up or composed of two parts, the main body portion B and the printing member C. As clearly illustrated in Fig. 3 the combined height of the portions B and C substantially equals the height of the type or, in words of the printers' art, the rule is "type high," and is used for printing or impressing lines upon printable surfaces in connection with other printing devices. The rule, as a whole, serves as a substitute for the usual brass rule used for a similar purpose and can be formed to print or impress all of the lines, marks or other impressions for which such devices are commonly employed, the body B of the rule being made of a thickness and its upper surface of a shape to correspond with the shape and size of the printing member C used therewith. In other words, the particular shape of the upper surface of the body portion is not an essential feature of the invention, except to the extent that it is formed to correspond with the shape of the ruling member C used therewith to the end that the ruling member may be and is rigidly or securely held in place upon the body portion.

In the preferred form of rule, as illustrated in Figs. 1, 2 and 3, and which is adapted to be associated with printing devices of ordinary or usual height the body portion B, which is preferably of slug height and is made of type metal is provided, upon its upper surface or edge, with thin feather edge flanges, lugs or ribs D extending longitudinally thereon and spaced apart to receive the base E of the ruling member C between them. The ruling member C is preferably made of brass or some equally hard metal and is triangular in cross section, presenting a flat base E to the top or supporting edge G of the body portion, and having a printing surface H on its upper edge. The ruling member C is held rigidly in place upon the body portion by the ribs or flanges D which are bent, formed or compressed downwardly upon the side faces J thereof.

It will be noted that all of the drawings are greatly enlarged from the actual sizes as the printing member C is comparatively so small in cross section that its features would not otherwise be readily seen.

Figure 7:
Figure 8:
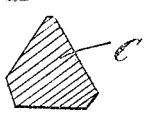
Figure 9:
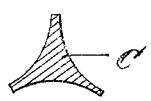
Figure 10:
Figure 11:
Figure 12:
Figure 13:
Figure 14:
Figure 15:
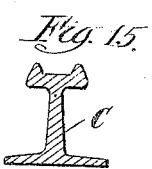
Figure 19:
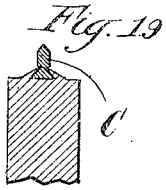
Figure 16:
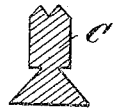
Figure 17:
Figure 18:
Figure 20:
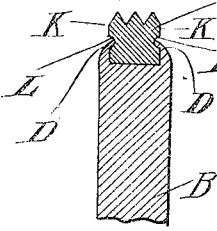
Figure 21:
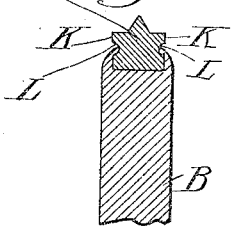

The preferred form of ruling edge or member C is an equilateral triangle in cross section, each of its three edges being formed similarly and either of which may be used as a printing edge. The ruling member C may be formed as illustrated in Fig. 4 the base of which is narrower than the other sides, and which is consequently of less cross sectional area and weight than the preferred form. The form of ruling member illustrated in Fig. 5 is particularly adapted for use in close work as the printing edge is disposed adjacent one edge of the width of the rule in position to print a line very close to the adjacent characters. The form illustrated in Fig. 6 is particularly advantageous as the faces of the ruling member are concave instead of flat and the member is consequently lighter in weight than the preferred form while still preserving the same width of base. Fig. 7 is an enlarged section of the preferred form of ruling member distinctly showing the three equal ruling edges or surfaces. The form of ruling member shown in Fig. 8 is similar to the preferred form except that each of its edges is a different width than the other two, thereby producing a member by means of which lines of differing widths can be printed depending upon which edge is arranged uppermost. Fig. 9 illustrates the form of ruling member shown in Fig. 6 but greatly enlarged, in order to clearly illustrate the concave side faces and the three equal ruling surfaces or edges. The modifications of the ruling member illustrated in Figs. 10 to 18 inclusive are sufficiently self explanatory not to require any further explanation. Those shown in Figs. 20 and 21 illustrate still other modifications of the invention, the ruling member C being provided with parallel side faces K and have longitudinal grooves L therein for engagement with the bent over ends of the flanges D. In the form illustrated in Fig. 22 the ruling member is provided with a single dovetail groove M in its under side and the body portion B is provided with a single central longitudinal rib N to correspond therewith. In securing the ruling member upon the body portion in this instance the rib N is compressed or deformed to fill the dovetail groove M and engage the inclined walls thereof. The rule illustrated in Fig. 27 is particularly adapted for printing a very wide or heavy line or it may be provided upon its broad printing surface with border lines or scroll work of any desired character. The rules illustrated in Figs. 23 to 26 inclusive are formed to print dots and dashes and may be formed slightly higher than type height to impress weakened lines in the material being printed.

The body portion B which forms the major portion of the rule serves as a support as well as a reinforcement of the comparatively slight ruling member C. While this body portion is preferably made of type metal, which is a comparatively inexpensive material, it might, under some circumstances be advantageous to make it of other inexpensive material, the broad idea of my invention being covered by a rule, the major portion of which is composed of an inexpensive material and having a ruling edge of suitably hard material secured thereto.

From the foregoing it will be seen that my novel rule is a comparatively cheap substitute for the ordinary or usual printer's brass rule and that it is capable of being formed to accomplish all of the purposes for which the ordinary rule may be used.

Having thus described my invention, I claim as new and desire to secure by Letters Patent:

1. A two-part composite rule for printers' use of dimensions adapting it to be included in a body of composed type and comprising a major portion of softer metal and a minor portion of harder metal, and of substantially triangular cross section, said minor portion resting upon the top edge of the major portion and presenting one of its flat sides thereto, said major portion being substantially slug-high and having bendable lugs upon its top edge within its side planes, said lugs being bent over and against the opposite inclined sides of said minor portion to hold said minor portion to and upon said top edge, substantially as described.

2. A two-part composite rule for printers' use of dimensions adapting it to be included in a body of composed type and comprising a major portion of relatively cheap metal and a minor portion of relatively more expensive metal, said minor portion being substantially triangular in cross section and having an upper printing edge and an opposed relatively broad flat base and resting upon the top edge of the major portion with its base contacting with the upper edge thereof, the combined height of the two portions being substantially equal to the height of the type with which the rule is adapted to be associated, said major portion being substantially slug-high and having oppositely disposed relatively small lugs upon its upper edge easily bendable for engagement with and over the opposite inclined sides of said minor portion, and said lugs being of less height than said minor portion, substantially as described.

3. A two-part composite rule for printers' use of dimensions adapting it to be included in a body of composed type and comprising a major type metal base portion and a minor upper portion, the minor portion having a narrow printing edge and flaring sides and presenting a relatively wide flat base to the major portion, said major portion being substantially slug-high and having integrally formed securing lugs upon its top edge with its side planes of such relative size that they are easily bendable to engage the flaring sides of the minor portion and to prevent the vertical separation of the two parts, substantially as described.

4. As a new article of manufacture, a composite printer's rule for association and use with ordinary printers' type and comprising a base portion of relatively soft metal of rule form and of substantially slug-height, and an upper portion of harder metal substantially equal in length with said base portion and substantially triangular in cross section, said upper portion resting throughout its length on said base portion and secured thereto by and between relatively small bendable lugs carried by said base portion, which are adapted to be bent or battered down upon the oppositely inclined sides of the upper portion, and said upper portion having a printing edge on its upper surface, the combined height of the two parts being equal to the height of the associated type.

5. As a new article of manufacture, a composite printer's rule for association and use with ordinary printers' type and comprising a lower part of relatively soft metal of rule form and substantially slug-height, and an upper relatively small wire-like part of harder metal, the upper part having a relatively narrow printing edge outwardly flaring sides and a relatively broad base, the two parts being arranged with the broad base of the upper part resting on the top edge of the lower part, relatively thin integral bendable lugs on the upper edge of the lower part between which the upper part is held, said lugs being bent or battered down upon the flaring sides of the upper part to retain it in position.

6. As a new article of manufacture, a composite printer's-rule for association and use with ordinary printers' type and comprising a base portion of bendable metal of rule form and substantially of slug height and an upper portion of harder metal, said upper portion being a wire-like member of triangular cross section, one of the edges thereof being arranged uppermost and adapted to print a line, and integral bendable projections on the base adapted to be bent over and upon the opposite inclined surfaces of the printing member to prevent the vertical separation of the two parts.

7. A composite rule for use in a body of composed type and comprising a relatively large body portion of bendable metal and rule form and of substantially of slug height, and a relatively small upper portion thereon, formed of a wire-like piece of harder metal having a narrow printing edge and a broad base and which is adapted to rest upon the upper edge of the body portion, and easily bendable integral lugs on the upper edge of the body portion bent or battered down upon opposite sides of said harder metal piece and extending inwardly over the base thereof to hold said members together.

8. A composite rule for use in a body of composed type and comprising a body portion of bendable metal of rule form and of substantially slug height, and an upper portion thereon formed of a wire-like piece of harder metal having a narrow printing edge and a broad base and which is adapted to rest upon the upper edge of the body portion, and easily bendable integral lugs on the upper edge of the body portion, their free edges embracing the lower part of said wire-like rule and preventing the removal thereof from the base.

9. A base for a composite printer's rule comprising a body portion of rule form and substantially slug high, and spaced bendable lugs upon the upper edges thereof as and for the purpose specified.

In testimony whereof, I have hereunto set my hand, this 29th day of August, 1910, in the presence of two subscribing witnesses.

ASHTON G. STEVENSON.

Witnesses:
 EDWARD F. WILSON,
 M. SIMON.